United States Patent
Lin et al.

(10) Patent No.: US 9,101,033 B2
(45) Date of Patent: Aug. 4, 2015

(54) SHORT PROTECTION CONTROL CIRCUITS AND RELATED CONTROL METHODS

(71) Applicant: Leadtrend Technology Corp., Hsin-Chu (TW)

(72) Inventors: Chung-Wei Lin, Hsin-Chu (TW); Hung-Ching Lee, Hsin-Chu (TW); Wei-Chi Huang, Hsin-Chu (TW); Tsung-Liang Hung, Hsin-Chu (TW); Pai-Feng Liu, Hsin-Chu (TW)

(73) Assignee: Leadtrend Technology Corp., Science-Based Industrial Park, Hsin-Chu (TW)

(*) Notice: Subject to any disclaimer, the term of this patent is extended or adjusted under 35 U.S.C. 154(b) by 338 days.

(21) Appl. No.: 13/666,964

(22) Filed: Nov. 1, 2012

(65) Prior Publication Data

US 2013/0114167 A1    May 9, 2013

(30) Foreign Application Priority Data

Nov. 4, 2011    (TW) .............................. 100140216 A

(51) Int. Cl.
*H02H 3/08* (2006.01)
*H02H 9/02* (2006.01)
*H05B 33/08* (2006.01)

(52) U.S. Cl.
CPC ............. *H05B 33/089* (2013.01); *Y02B 20/341* (2013.01)

(58) Field of Classification Search
CPC ...................................................... H05B 33/089
USPC .............. 361/90, 92, 93.1, 93.2; 315/119–128
See application file for complete search history.

(56) References Cited

U.S. PATENT DOCUMENTS

| | | | |
|---|---|---|---|
| 8,269,425 B2 * | 9/2012 | Kawata et al. ................ 315/291 |
| 8,860,315 B2 * | 10/2014 | Lee et al. ...................... 315/122 |
| 2009/0295776 A1 * | 12/2009 | Yu et al. ........................ 345/212 |
| 2010/0201283 A1 * | 8/2010 | Kawata et al. ................ 315/287 |
| 2012/0074868 A1 * | 3/2012 | Tseng et al. .................. 315/294 |
| 2012/0119653 A1 * | 5/2012 | Bianco et al. ................. 315/127 |
| 2012/0161639 A1 * | 6/2012 | Lee et al. ...................... 315/122 |
| 2012/0169243 A1 * | 7/2012 | Lin et al. .................. 315/200 R |
| 2012/0181931 A1 * | 7/2012 | Katsura .......................... 315/82 |
| 2013/0016310 A1 * | 1/2013 | Kanemitsu et al. ............. 349/69 |

(Continued)

FOREIGN PATENT DOCUMENTS

| CN | 101056485 A | 10/2007 |
|---|---|---|
| CN | 101154886 A | 4/2008 |

(Continued)

*Primary Examiner* — Thienvu Tran
*Assistant Examiner* — Christopher Clark
(74) *Attorney, Agent, or Firm* — Winston Hsu; Scott Margo

(57) ABSTRACT

Short protection control circuits and related control methods are disclosed. A disclosed short protection control circuit is adapted for controlling a short protection mechanism providing short protection to several LED chains. The disclosed short protection control circuit has a detection circuit, a first logic circuit and a timer. Coupled to the LED chains, the detection circuit asserts an indication signal when one of the node voltages of the LED chains is lower than an undercurrent reference. When the indication signal is enabled, the first logic circuit starts blocking the short protection mechanism. The timer times to provide a result when the short protection mechanism is blocked. When the result indicates that the short protection mechanism has been blocked for at least a predetermined time period, the first logic circuit resumes the short protection mechanism.

14 Claims, 7 Drawing Sheets

(56) References Cited

U.S. PATENT DOCUMENTS

| | | | |
|---|---|---|---|
| 2013/0082603 A1* | 4/2013 | Hsu et al. | 315/122 |
| 2013/0093327 A1* | 4/2013 | Lee | 315/122 |
| 2013/0271008 A1* | 10/2013 | Lin et al. | 315/122 |
| 2014/0232547 A1* | 8/2014 | Kanemitsu et al. | 340/815.45 |

FOREIGN PATENT DOCUMENTS

| | | |
|---|---|---|
| CN | 102003689 A | 4/2011 |
| CN | 102186276 A | 9/2011 |
| CN | 102196623 A | 9/2011 |
| CN | 102300376 A | 12/2011 |

\* cited by examiner

SHORT PROTECTION CONTROL CIRCUITS AND RELATED CONTROL METHODS

BACKGROUND OF THE INVENTION

1. Field of the Invention

The present invention relates to control methods and circuits for LED chains, and more particularly to control methods for short protection in LED chains.

2. Description of the Prior Art

In an age concerned with energy conservation and carbon reduction, light-emitting diodes (LEDs) are already a widely adopted light source due to their superior lighting efficiency and miniature component size. For example, LEDs have already replaced cold-cathode fluorescent lamps (CCFLs) as a backlight in current liquid crystal display (LCD) panels.

FIG. 1 is a diagram illustrating an LED power supply 18 used in a backlight module of an LCD panel, which is primarily used to control lighting of LED chains $L_1$-$L_N$. Each LED chain has a plurality of series-connected LEDs. Backlight controller 20 controls a power switch of booster 19 to cause an inductive element to draw energy from input node IN, and release energy into output node OUT, so as to establish an appropriate output voltage $V_{OUT}$ on output node OUT to drive the LED chains. Backlight controller 20 detects output voltage $V_{OUT}$ through over-voltage protection node OVP and voltage divider resistors $RD_1$, $RD_2$.

Driving nodes $LED_1$-$LED_4$ of backlight controller 20 are connected to LED chains $L_1$-$L_4$, respectively, for draining driving current of LED chains $L_1$-$L_4$, and controlling current flowing through each LED chain to be approximately equal to achieve the goal of uniform brightness.

Backlight controller 20 may also determine whether any LED encounters a fault condition from driving nodes $LED_1$-$LED_4$, so as to trigger related protection. For example, if LED detection voltage $V_{LED-1}$ on driving node $LED_1$ is continually 0V, LED chain $L_1$ may be an open-circuited LED chain, where at least one LED thereof is open-circuited, in which case backlight controller 20 turns off driving of LED chain $L_1$. This type of protection is typically called open circuit protection. In another example, if LED detection voltage $V_{LED-1}$ on driving node $LED_1$ is much greater than LED detection voltage $V_{LED-2}$ on driving node $LED_2$, it can roughly be ascertained that LED chain $L_1$ has a few LEDs that are short-circuited, and driving of LED chain $L_1$ can be turned off. This type of protection is typically called short circuit protection.

However, open circuit protection and short circuit protection may interfere with each other. Thus, an appropriate process is needed to activate or stop open and short circuit protections, so as to achieve the desired protection effect.

SUMMARY OF THE INVENTION

According to an embodiment, a control method is used in controlling a short protection mechanism providing short protection to a plurality of light-emitting diode (LED) chains. A plurality of driving currents flow through the LED chains. The control method comprises detecting whether at least one of the driving currents encounters an under-current event; blocking a short protection mechanism when the under-current event is encountered; and resuming the short protection mechanism after the short protection mechanism is blocked for at least a predetermined time period. The short protection mechanism provides short protection to the LED chains.

According to an embodiment, a short protection control circuit is for controlling a short protection mechanism. The short protection mechanism provides short protection applied to a plurality of light-emitting diode (LED) chains. The short protection control circuit comprises a detection circuit coupled to the LED chains for generating an indication signal whenever any terminal voltage of the LED chains is lower than an under-current reference value; a first logic circuit for starting blocking of the short protection mechanism when the indication signal is enabled; and a timer for counting time when the short protection mechanism is blocked to generate a timing result. The first logic circuit resumes the short protection mechanism after the timing result indicates that the short protection mechanism has been blocked for at least a predetermined time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
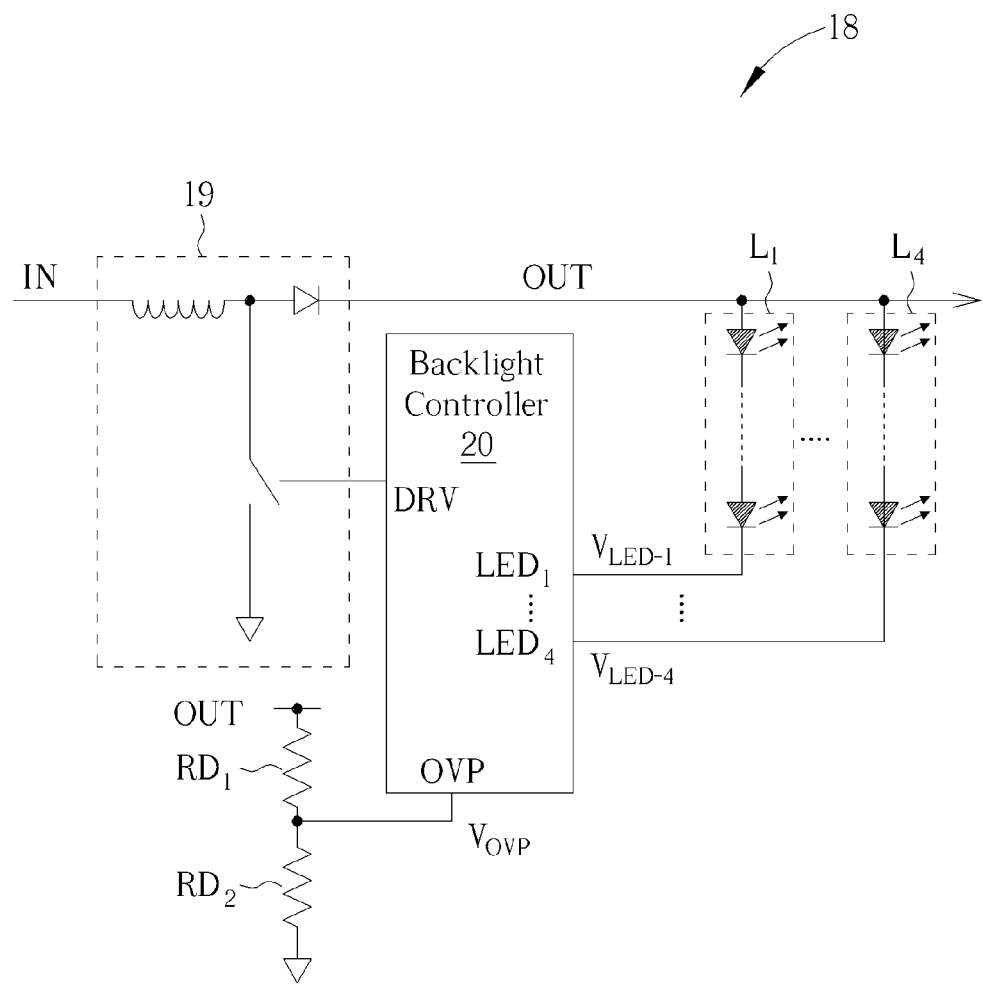
FIG. 1 is a diagram illustrating an LED power supply used in a backlight module of an LCD panel.
Figure 2:
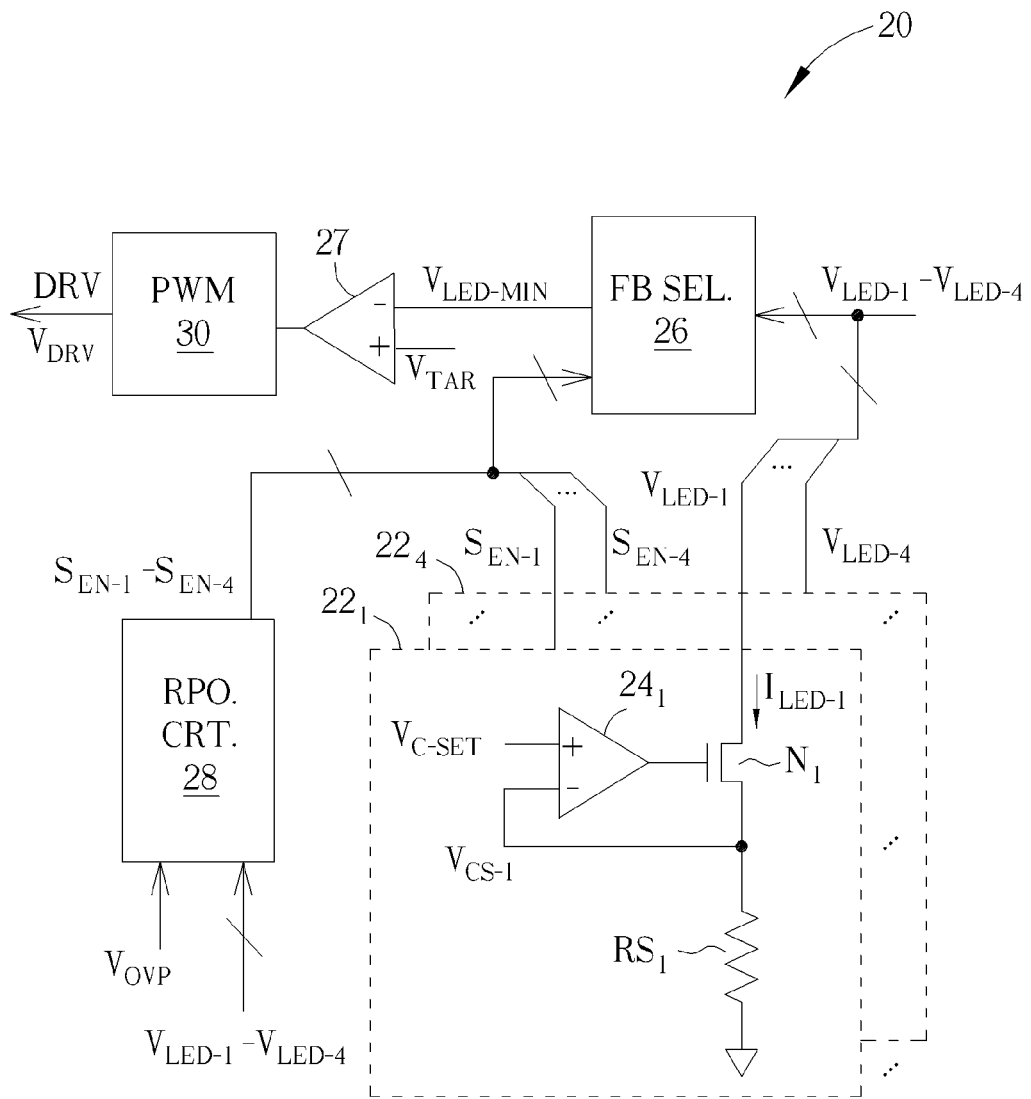
FIG. 2 is a diagram of backlight controller according to an embodiment.

FIG. 2 is a diagram of backlight controller 20 according to an embodiment, which can be used in LED power supply 18 of FIG. 1. In some embodiments, backlight controller 20 is a monolithic integrated circuit (IC). In the present disclosure, backlight controller 20 drives four LED chains $L_1$-$L_4$. In other embodiments, backlight controller 20 may drive different numbers of LED chains, and is not limited to four.

In backlight controller 20, fixed current drivers $22_1$-$22_4$ are connected to driving nodes $LED_1$-$LED_4$, respectively, to cause driving currents $I_{LED-1}$-$I_{LED-4}$ flowing through LED chains $L_1$-$L_4$ to be roughly equal, so that LED chains $L_1$-$L_4$ have uniform brightness. For example, fixed current driver $22_1$ has error amplifier $24_1$, NMOS transistor $N_1$, and current sense resistor $RS_1$. From the circuit diagram of fixed current driver $22_1$ it can be seen that, in normal operation, driving current $I_{LED-1}$ is approximately equal to set voltage $V_{C-SET}$ divided by $R_{RS1}$, where $R_{RS1}$ is resistance value of current sense resistor $RS_1$. Fixed current drivers $22_2$-$22_4$ may be known from the description of fixed current driver $22_1$.

In some embodiments, feedback selector 26 takes the smallest of LED detection voltages $V_{LED-1}$-$V_{LED-4}$ to be minimum detection voltage $V_{LED-MIN}$ for transmission to inverting terminal of error amplifier 27. Non-inverting terminal of error amplifier 27 receives preset target voltage $V_{TAR}$. Pulse width adjuster 30 generates driving signal $V_{DRV}$ according to output of error amplifier 27 to control power switch of booster 19. Under stable conditions, minimum detection voltage $V_{LED-MIN}$ is roughly equal to target voltage $V_{TAR}$, which roughly causes LED power supply 18 of FIG. 1 to operate in a relatively more efficient state.

Protection circuit 28 determines whether any of LED chains $L_1$-$L_4$ encounters a fault condition according to detection voltage $V_{OVP}$ on over-voltage protection node OVP and LED detection voltages $V_{LED-1}$-$V_{LED-4}$ on driving nodes $LED_1$-$LED_4$ to generate selection signals $S_{EN-1}$-$S_{EN-4}$. For example, fault conditions comprise LED open circuit events (at least one LED chain has an open circuit), LED short circuit events (at least one LED chain has a short circuit), etc. In other embodiments, protection circuit may determine whether any of LED chains $L_1$-$L_4$ encounters a fault condition further (or only) according to input or output of error amplifier $24_1$-$24_4$. For example, if LED chain $L_1$ is identified as encountering a fault condition, protection circuit 28 disables selection signal $S_{EN-1}$. Disabled selection signal $S_{EN-1}$ causes fixed current driver $22_1$ to not drive LED chain $L_1$, meaning driving current $I_{LED-1}$ becomes 0 A. Disabled selection signal $S_{EN-1}$ also causes minimum detection voltage $V_{LED-MIN}$ to be independent of LED detection voltage $V_{LED-1}$, causing feedback selector 26 to not select LED detection voltage $V_{LED-1}$ as minimum detection voltage $V_{LED-MIN}$.

LED open circuit events may cause mistaken triggering of short circuit protection. For example, LED chain $L_1$ may become open-circuited for some reason at a point in time, while LED chains $L_2$-$L_4$ are normal. LED detection voltage $V_{LED-1}$ may roughly equal 0V, causing minimum detection voltage $V_{LED-MIN}$ to also be roughly 0V, which is lower than target voltage $V_{TAR}$. At this time, output voltage of error amplifier 27 is pulled up continuously, and pulse width adjuster 30 causes booster 19 to increase output energy, pulling up output voltage $V_{OUT}$ and LED detection voltages $V_{LED-2}$-$V_{LED-4}$. If careful circuit design is not employed, at this time, LED chains $L_2$-$L_4$ are likely to be mistakenly determined as encountering LED short circuit events, which will mistakenly trigger short circuit protection, because LED detection voltages $V_{LED-2}$-$V_{LED-4}$ are much greater than LED detection voltage $V_{LED-1}$ or target voltage $V_{TAR}$ at this time.

Figure 3:
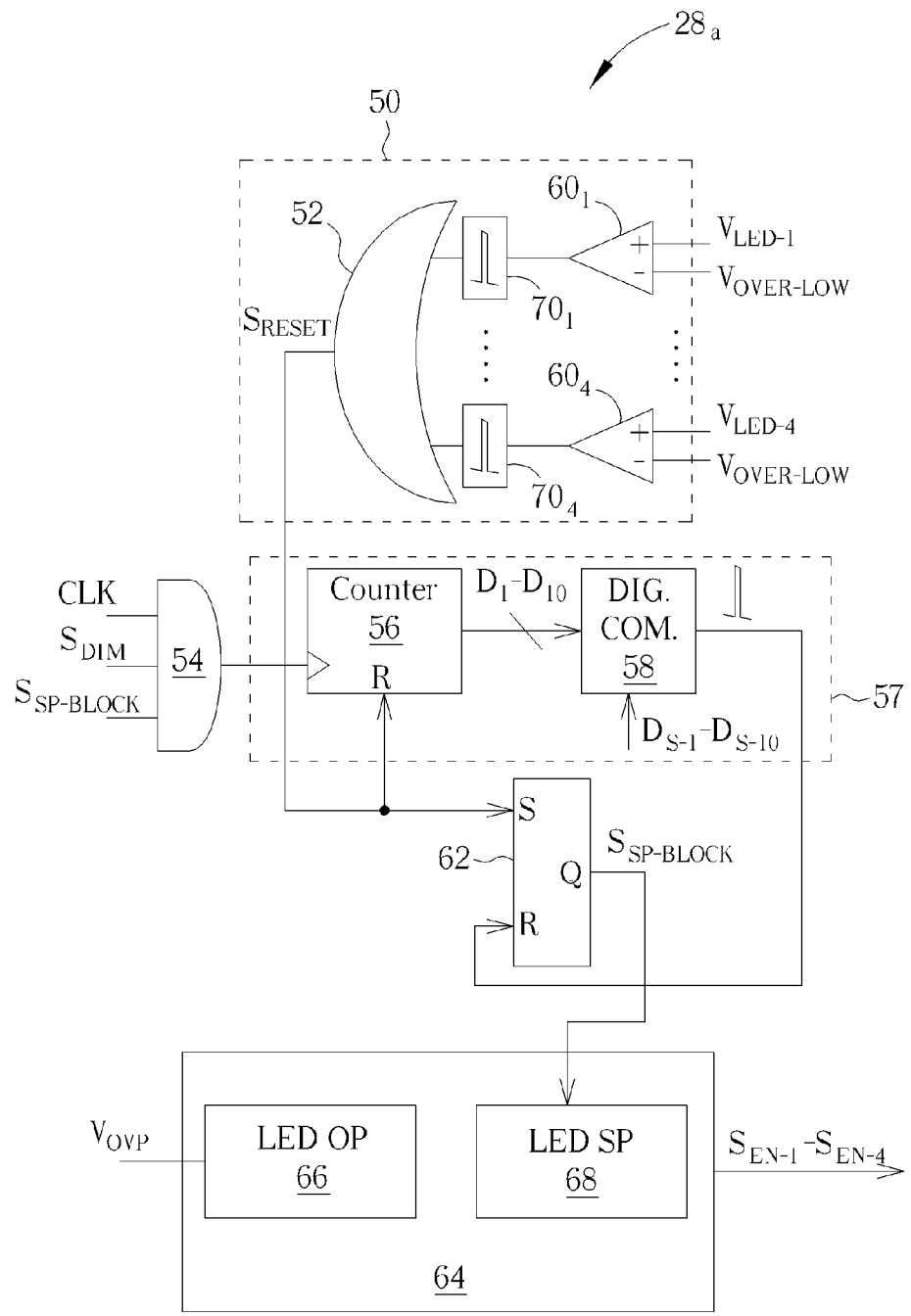
FIG. 3 shows one type of protection circuit.

FIG. 3 shows one type of protection circuit $28_a$, which when used in FIG. 2, can prevent LED open circuit events from erroneously triggering short circuit protection. Protection circuit $28_a$ has detection circuit 50, timer 57, protection determination circuit 64, AND gate 54, and SR flip-flop 62.

In detection circuit 50, comparators $60_1$-$60_4$ respectively couple to LED chains $L_1$-$L_4$. Outputs of comparators $60_1$-$60_4$ couple to pulse generators $70_1$-$70_4$ having rising and falling edge triggering. Outputs of pulse generators $70_1$-$70_4$ are all connected to OR gate 52. For the most part, any time any one LED detection voltage $V_{LED-n}$ (where n is an integer from 1-4) is lower than under-current reference value $V_{OVER-LOW}$, comparator $60_n$ changes state to logic "1," thereby triggering pulse generator $70_n$ to send out a pulse as an indicator signal. This pulse passes through OR gate 52 to appear in reset signal $S_{RESET}$. Taking LED chain $L_1$ as an example, when LED detection voltage $V_{LED-1}$ is lower than under-current reference value $V_{OVER-LOW}$, this indicates that driving current $I_{LED-1}$ is also too low, so that LED chain $L_1$ is determined to have encountered an under-current event. As long as any one LED chain encounters an under-current event, a pulse will appear on reset signal $S_{RESET}$ outputted by detection circuit 50.

Pulse on reset signal $S_{RESET}$ may set SR flip-flop 62, enabling SR flip-flop 62 outputted by short circuit blocking signal $S_{SP-BLOCK}$. Pulse on reset signal $S_{RESET}$ also resets timer 57, causing timer 57 to return to a starting point thereof, to prepare to start counting.

Protection determination circuit 64 has LED open circuit protection circuit 66 and LED short circuit protection circuit 68, which respectively provide open circuit protection mechanisms and short circuit protection mechanisms. In an embodiment, when one LED chain is determined to have encountered an under-current event, and detection voltage $V_{OVP}$ exceeds over-voltage reference value $V_{OVP-REF}$, open circuit protection mechanism provided by LED open circuit protection circuit 66 will determine that the LED chain encountered an LED open circuit event, and disable a corresponding selection signal, which is one of selection signals $S_{EN-1}$-$S_{ED-4}$. In some embodiments, when LED detection voltage $V_{LED-n}$ exceeds a short circuit reference value $V_{SP-REF}$, short circuit protection mechanism of LED short circuit protection circuit 68 will determine that LED chain $L_n$ encountered an LED open circuit event, and disable selection signal $S_{EN-n}$. When short circuit protection blocking signal $S_{SP-BLOCK}$ is disabled, LED short circuit protection circuit 68 operates normally to provide short circuit protection mechanisms. When short circuit protection blocking signal $S_{SP-BLOCK}$ is enabled, short circuit protection mechanisms provided by LED short circuit protection circuit 68 are blocked, meaning selection signals $S_{EN-1}$-$S_{ED-4}$ are not affected by detection result of LED short circuit protection circuit 68, or LED short circuit protection circuit 68 completely ignores LED detection voltages $V_{LED-1}$-$V_{LED-4}$.

Timer 57 has counter 56 and digital comparator 58. Counter 56 counts according to a signal inputted by a clock. When timer results $D_1$-$D_{10}$ of counter 56 reach a certain condition, e.g. timer results $D_1$-$D_{10}$ are the same as reference values $D_{S-1}$-$D_{S-10}$, digital comparator 58 generates a pulse, resetting SR flip-flop 62, disabling short circuit blocking signal $S_{SP-BLOCK}$, and restoring short circuit protection mechanisms provided by LED short circuit protection circuit 68.

AND gate 54 controls clock input to counter 56. Only when dimming signal $S_{DIM}$ and short circuit blocking signal $S_{SP-BLOCK}$ are both enabled is clock signal CLK able to be sent to clock input of counter 56 by AND gate 54. Dimming signal $S_{DIM}$ being enabled represents normal LED chains (LED chains that have not been discovered to have encountered fault conditions) need to be lit. Conversely, when dimming signal $S_{DIM}$ is disabled, all LED chains are unlit.

Simply stated, if anyone LED chain encounters an under-current event, short circuit protection blocking signal $S_{SP-BLOCK}$ will be enabled, blocking short circuit protection mechanisms, and resetting counter 56. Counter 56 counts a paused time that passes while normal LED chains are lit, and short circuit protection blocking signal $S_{SP-BLOCK}$ is enabled. After this paused time reaches a preset time corresponding to reference value $D_{S-1}$-$D_{S-10}$, short circuit protection blocking signal $S_{SP-BLOCK}$ is disabled, restoring short circuit protection mechanisms.

In the embodiment of FIG. 3, when short circuit protection mechanisms are blocked, if another under-current event is encountered, counter 56 will be reset again, and prepare to count again. In some embodiments, when short circuit protection mechanisms are blocked, if another under-current event occurs, counter does not necessarily restart counting.

Figure 4:
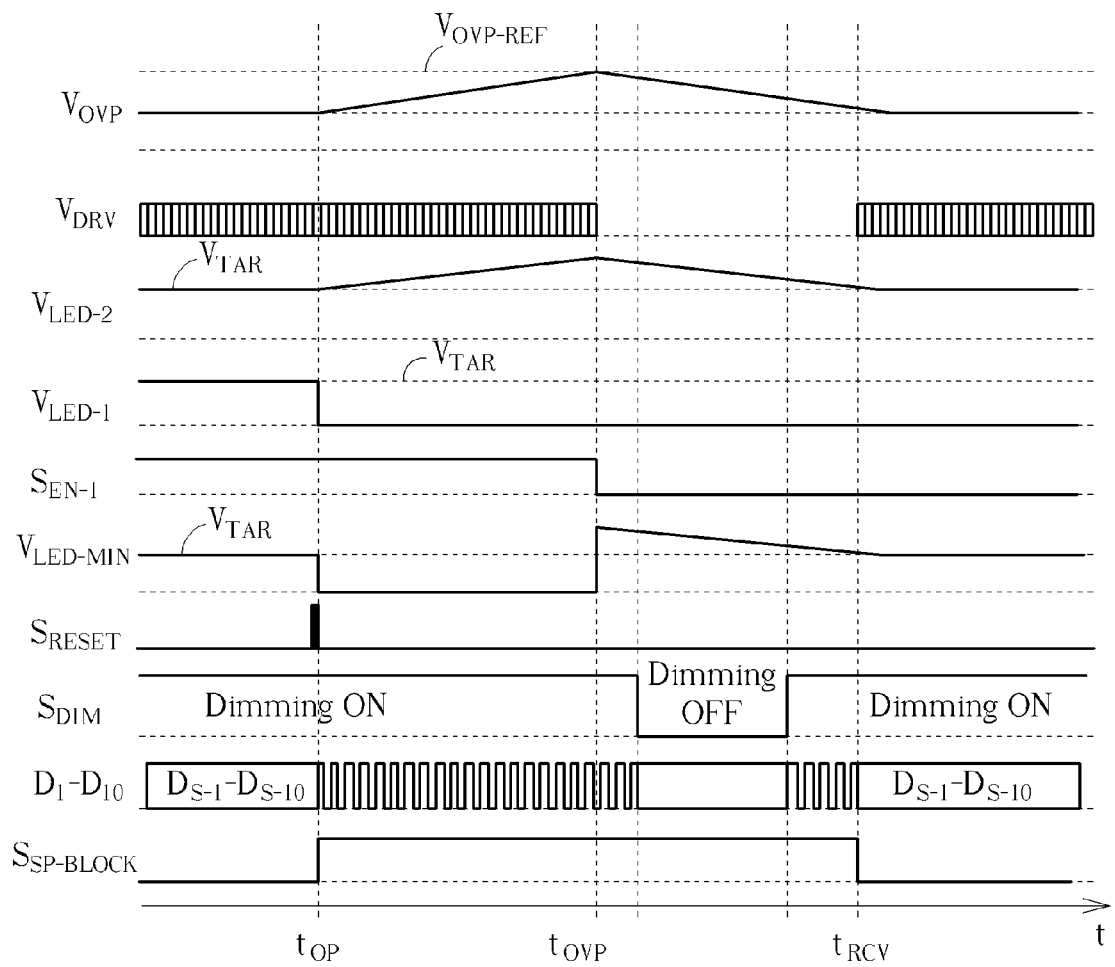
FIG. 4 shows some signal waveforms of FIG. 2 and FIG. 3 when an LED chain becomes open-circuited.

FIG. 4 shows some signal waveforms of FIG. 2 and FIG. 3 when LED chain $L_1$ becomes open-circuited. From top to bottom, signals represented include detection voltage $V_{OVP}$, driving signal $V_{DRV}$, LED detection voltage $V_{LED-2}$, LED detection voltage $V_{LED-1}$, selection signal $S_{EN-1}$, minimum detection voltage $V_{LED-MIN}$, reset signal $S_{RESET}$, dimming signal $S_{DIM}$, timer results $D_1$-$D_{10}$, and short circuit protection blocking signal $S_{SP-BLOCK}$.

Please refer to FIG. 2, FIG. 3, and FIG. 4. In FIG. 4, prior to time $t_{OP}$, LED chains $L_1$-$L_4$ are approximately the same, and are all normal, with LED detection voltages $V_{LED-1}$-$V_{LED-4}$ and minimum detection voltage $V_{LED-MIN}$ all roughly equal to target voltage $V_{TAR}$.

Assume LED chain $L_1$ suddenly becomes open-circuited at time $t_{OP}$, and LED chains $L_2$-$L_4$ are normal. Thus, at time $t_{OP}$, LED detection voltage $V_{LED-1}$ and minimum detection voltage $V_{LED-MIN}$ both suddenly change to 0V. Because LED detection voltage $V_{LED-1}$ is lower than under-current reference value $V_{OVER-LOW}$, at time $t_{OP}$, a pulse appears in reset signal $S_{RESET}$, and short circuit protection blocking signal $S_{SP-BLOCK}$ is enabled. Starting from time $t_{OP}$, short circuit protection mechanisms provided by LED short circuit protection circuit 68 are blocked, and short circuit protection is no longer provided.

In order to cause minimum detection voltage $V_{LED-MIN}$ to approach target voltage $V_{TAR}$, error amplifier 27 and pulse width adjuster 30 cause output voltage $V_{OUT}$ and detection voltage $V_{OVP}$ to rise together. Voltage drop across a normal LED chain is roughly fixed, so LED detection voltage $V_{LED-2}$ rises with rising output voltage $V_{OUT}$. However, because LED chain $L_1$ is open-circuited, LED detection voltage $V_{LED-1}$ and minimum detection voltage $V_{LED-MIN}$ stay at 0V, and do not change with varying output voltage $V_{OUT}$.

At time $t_{OVP}$, detection voltage $V_{OVP}$ exceeds over-voltage reference value $V_{OVP-REF}$, thus LED open circuit protection circuit 66 determines that LED chain $L_1$ corresponding to relatively low LED detection voltage $V_{LED-1}$ (currently 0V) encounters an LED open circuit event, and disables selection signals $S_{EN-1}$. Disabled selection signal $S_{EN-1}$ causes minimum detection voltage $V_{LED-MIN}$ to break away from control of LED detection voltage $V_{LED-1}$, so that minimum detection voltage $V_{LEL-MIN}$ suddenly jumps up, and starts to follow the minimum of other normal LED detection voltages, as shown.

After time $t_{OVP}$, and in order to cause minimum detection voltage $V_{LED-MIN}$ to approach target voltage $V_{TAR}$, output voltage $V_{OUT}$ and detection voltage $V_{OVP}$ slowly drop with consumed energy.

Counter 56 is reset at time $t_{OP}$. Then, in a dimming ON period, i.e. when dimming signal $S_{DIM}$ is enabled, counter 56 counts with clock signal CLK. In a dimming OFF period, i.e. when dimming signal $S_{DIM}$ is disabled, counter 56 cannot receive clock signal CLK, and pauses counting. At time $t_{RCV}$, timer results $D_1$-$D_{10}$ of counter 56 equal reference values $D_{S-1}$-$D_{S-10}$, and short circuit protection blocking signal $S_{SP-BLOCK}$ is disabled, restoring short circuit protection mechanisms provided by LED short circuit protection circuit 68.

It can be seen from FIG. 4 that between time $t_{OP}$ and time $t_{RCV}$, short circuit protection blocking signal $S_{SP-BLOCK}$ is enabled, so that short circuit protection of all LED chains $L_1$-$L_N$ is blocked and has no effect. It can be understood from FIG. 4 that time $t_{OP}$ and time $t_{RCV}$, i.e. paused time in which short circuit protection mechanisms are blocked, is approximately equal to the sum of preset time corresponding to reference value $D_{S-1}$-$D_{S-10}$ and dimming OFF period. Thus, as long as preset time is designed to be sufficiently long, even though LED detection voltage $V_{LED-2}$ may be relatively high due to open circuiting of LED chain $L_1$, LED chain $L_2$ will not be erroneously determined to have encountered a short circuit event.

Figure 5:
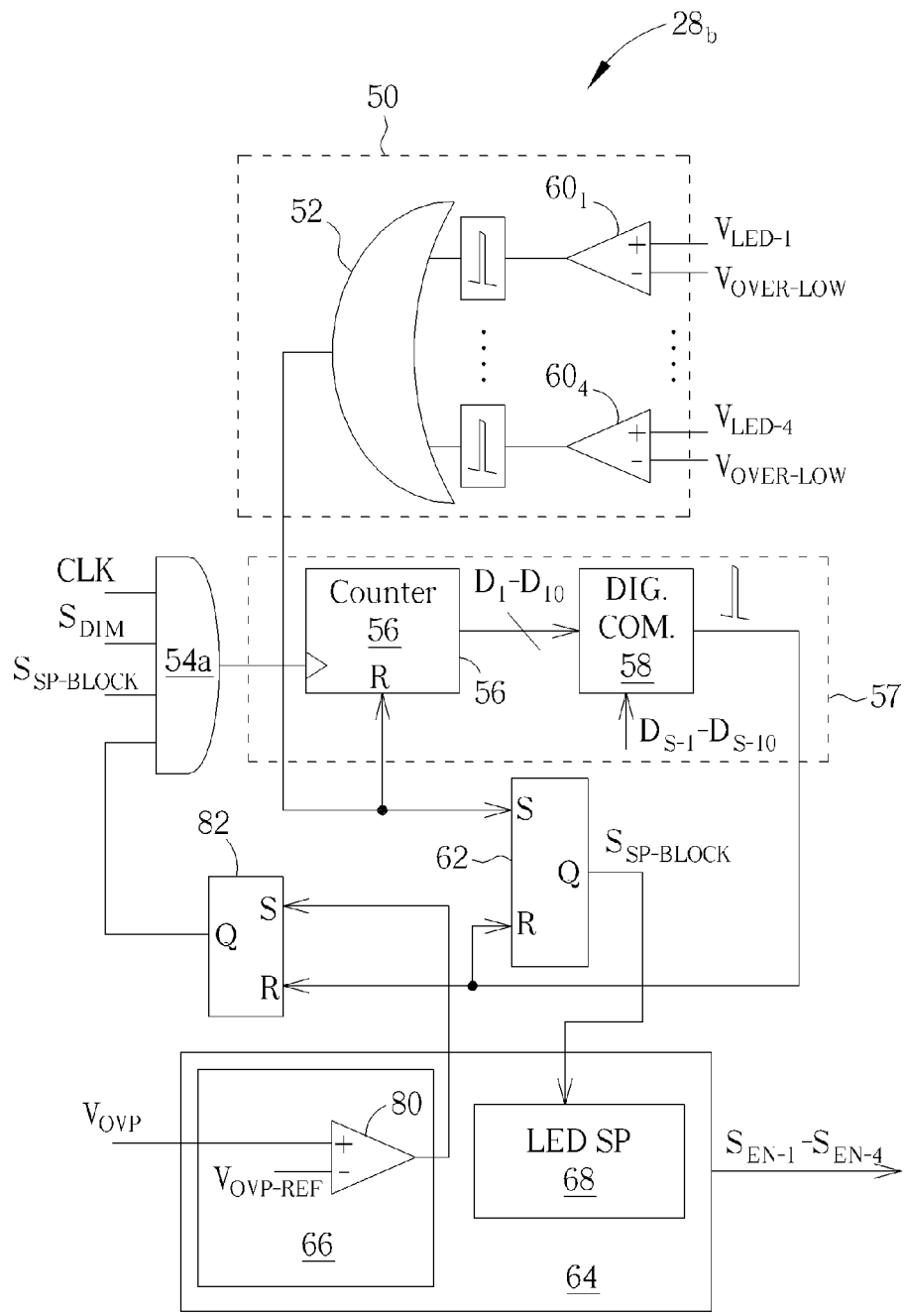
FIG. 5 shows another protection circuit.

FIG. 5 shows another protection circuit $28_b$, which when used in FIG. 2, may prevent LED open circuit events from erroneously triggering short circuit protection. Similar or the same features of protection circuit $28_b$ of FIG. 5 and protection circuit $28_a$ of FIG. 3 can be understood according to the above description of FIG. 3, and are not repeated.

Different from protection circuit $28_a$ of FIG. 3, protection circuit $28_b$ of FIG. 5 additionally includes SR flip-flop 82, comparator 80, and AND gate 54$a$. Stated simply, after detection voltage $V_{OVP}$ exceeds over-voltage reference value $V_{OVP-REF}$, comparator 80 sets SR flip-flop 82, so that clock signal CLK can reach clock input of counter 56, and counter 56 can begin counting. While comparator 58 disables short circuit protection blocking signal $S_{SP-BLOCK}$, SR flip-flop 82 is also reset, and outputs logic "0."

Figure 6:
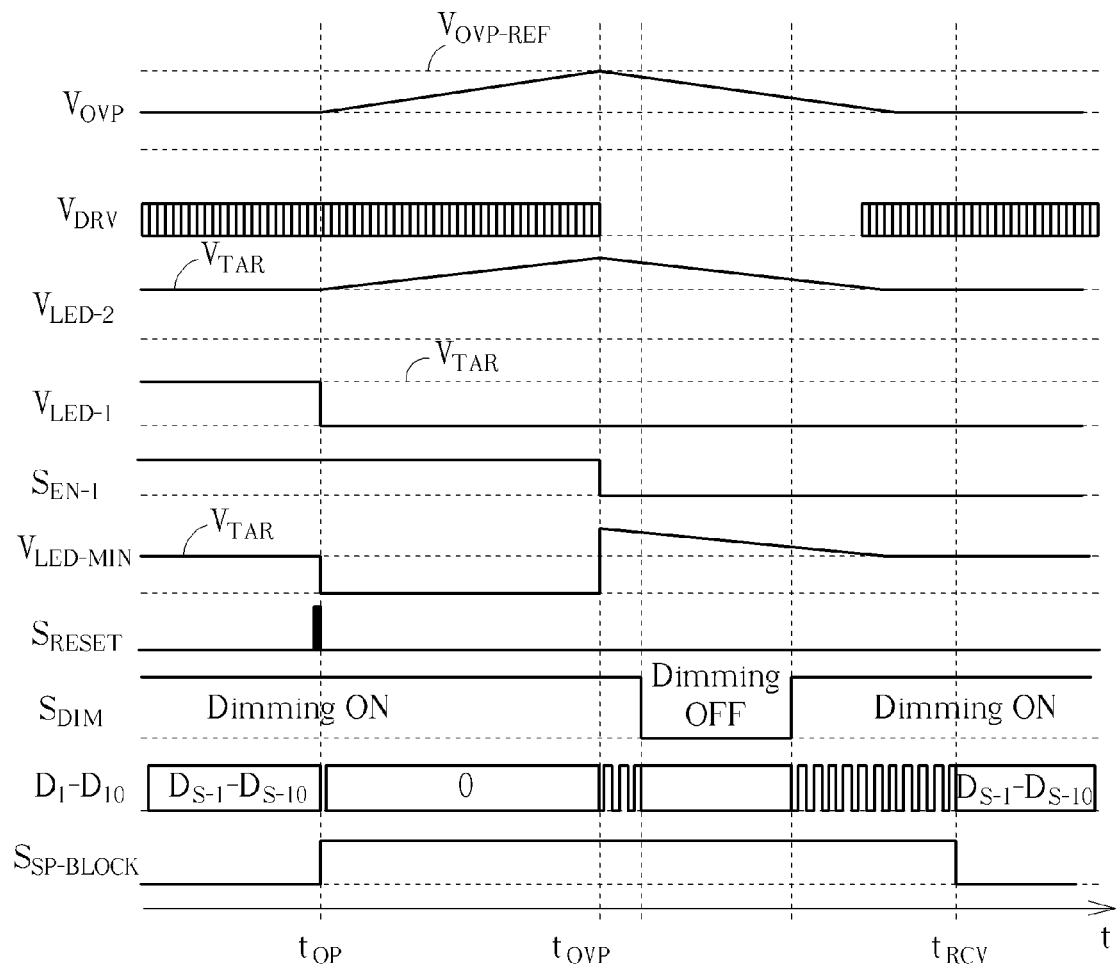
FIG. 6 shows FIG. 2 and FIG. 5 some signal waveforms when an LED chain becomes open-circuited.

FIG. 6 shows FIG. 2 and FIG. 5 some signal waveforms when LED chain $L_1$ becomes open-circuited. From top to bottom, signals represented include detection voltage $V_{OVP}$, driving signal $V_{DRV}$, LED detection voltage $V_{LED-2}$, LED detection voltage $V_{LED-1}$, selection signal $S_{EN-1}$, minimum detection voltage $V_{LED-MIN}$, reset signal $S_{RESET}$, dimming signal $S_{DIM}$, timer results $D_1$-$D_{10}$, and short circuit protection blocking signal $S_{SP-BLOCK}$.

Please refer to FIG. 5 and FIG. 6. Even though timer results $D_1$-$D_{10}$ become 0 when counter 56 is reset at time $t_{OP}$, output of SR flip-flop 82 becomes logic 0, and counter 56 does not receive clock signal CLK, so that counter 56 does not start counting. Clock signal CLK must wait until after detection voltage $V_{OVP}$ exceeds over-voltage reference value $V_{OVP-REF}$ at time $t_{OVP}$ before being able to reach clock input of counter 56, so that counter 56 begins to count. Thus, it can be seen from FIG. 6 that time $t_{OP}$ and time $t_{RCV}$, i.e. paused time during which short circuit protection mechanisms are blocked, is roughly equal to the sum of time from time $t_{OP}$ to time $t_{OVP}$, preset time corresponding to reference value $D_{S-1}$-$D_{S-10}$, and dimming OFF period. If reference values $D_{S-1}$-$D_{S-10}$ are all the same, compared to paused time in FIG. 4, paused time in FIG. 6 is longer due to additional time from time $t_{OP}$ to time $t_{OVP}$.

Figure 7:
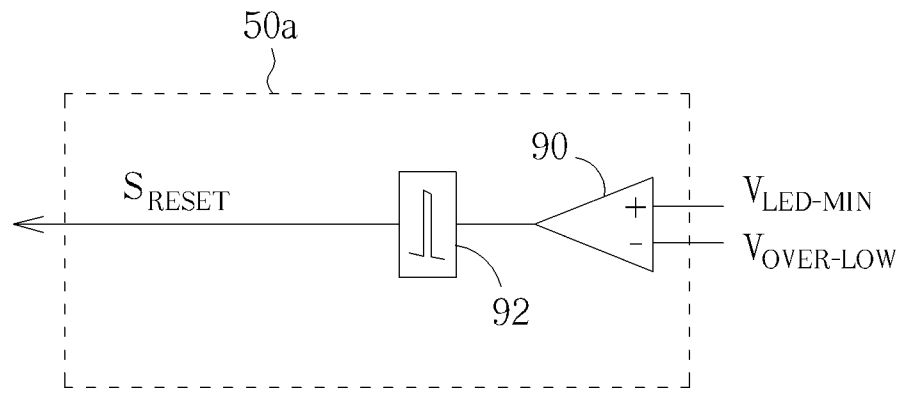
FIG. 7 shows another detection circuit.

FIG. 7 shows another detection circuit 50$a$, which replaces detection circuit 50 of FIG. 3 and FIG. 5 in some embodiments. Minimum detection voltage $V_{LED-MIN}$ roughly corresponds to minimum LED detection voltage corresponding to normal LED chains. So, minimum detection voltage $V_{LED-MIN}$ dropping below under-current reference value $V_{OVER-LOW}$ represents one lit LED chain already encountered an under-current event, so that comparator 90 causes rising-edge-triggered pulse generator 92 to emit a pulse.

Figure 8:
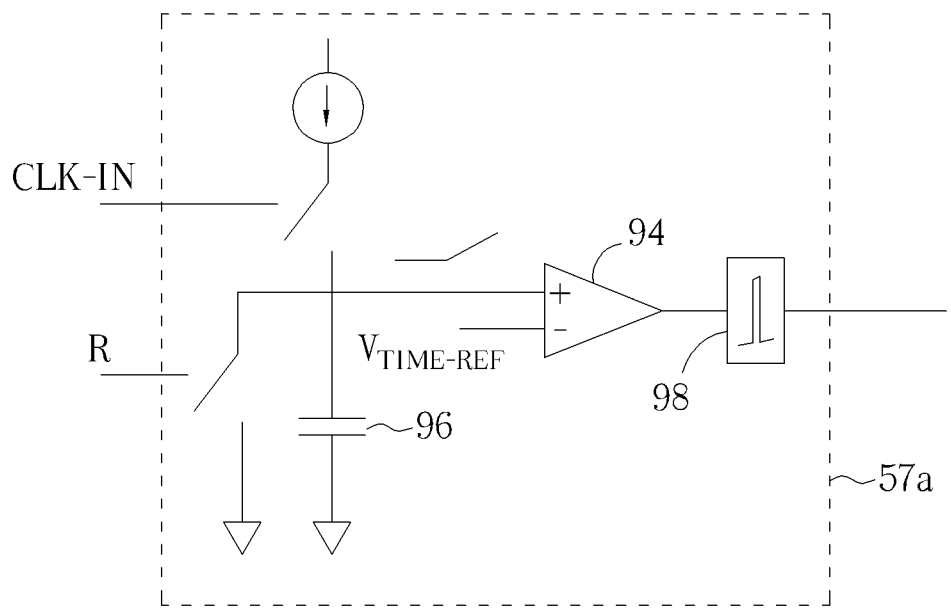
FIG. 8 shows an analog timer.

FIG. 8 shows an analog timer 57$a$, which replaces digital timer 57 of FIG. 3 and FIG. 5 in some embodiments. A pulse on clock input CLK-IN can cause stepwise increase of voltage drop across capacitor 96. When voltage drop across capacitor 96 reaches time reference voltage $V_{TIME-REF}$, comparator 94 causes rising-edge-triggered pulse generator 98 to emit a pulse. Enable signal on reset node R may cause voltage drop across capacitor 96 to become 0V, causing timer 57$a$ to count again with pulses on clock input CLK-IN.

In the above embodiments, protection circuit has the following features:

Short circuit protection mechanisms are blocked after under-current events occur.

Short circuit protection mechanisms are blocked for paused time at least as long as a preset time corresponding to reference values $D_{S-1}$-$D_{S-10}$.

After each under-current event occurs, counter starts counting again.

In dimming OFF period, counter pauses counting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for use in controlling a short protection mechanism providing short protection to a plurality of light-emitting diode (LED) chains, wherein a plurality of driving currents flow through the LED chains, the control method comprising:

detecting whether at least one of the driving currents encounters an under-current event;

blocking a short protection mechanism and resetting a timer when the under-current event is encountered, wherein the short protection mechanism provides short protection to the LED chains; and resuming the short protection mechanism after the short protection mechanism is blocked for at least a predetermined time period.

2. The control method of claim 1, further comprising:
resetting the timer every time the under-current event is encountered.

3. The control method of claim 1, further comprising:
pausing the timer when a dimming signal is disabled.

4. The control method of claim 1, wherein the timer is a counter, and the counter counts according to a clock signal when the short protection mechanism is blocked.

5. The control method of claim 1, further comprising:
resetting a counter every time the under-current event is encountered; and
resuming the short protection mechanism when a count result of the counter exceeds a predetermined result.

6. The control method of claim 1, further comprising:
detecting a smallest voltage of driving nodes of the LED chains to regulate an output power, wherein the output power is used for driving the LED chains;
detecting the output power; and
starting the timer after the output power exceeds an over-voltage value.

7. The control method of claim 1, further comprising:
detecting a smallest voltage of driving nodes of the LED chains to regulate an output power, wherein the output power is used for driving the LED chains;
comparing the output power with an over-voltage value; and
starting the timer after the output power exceeds the over-voltage value and the under-current event is encountered.

8. A short protection control circuit for controlling a short protection mechanism, wherein the short protection mechanism provides short protection applied to a plurality of light-emitting diode (LED) chains, the short protection control circuit comprising:

a detection circuit coupled to the LED chains for generating an indication signal whenever any terminal voltage of the LED chains is lower than an under-current reference value;

a first logic circuit for starting blocking of the short protection mechanism when the indication signal is enabled; and a timer for counting time when the short protection mechanism is blocked to generate a timing result;

wherein the first logic circuit resumes the short protection mechanism after the timing result indicates that the short protection mechanism has been blocked for at least a predetermined time period.

9. The short protection control circuit of claim 8, wherein the detection circuit comprises:

at least one pulse generator for emitting a pulse to start blocking the short protection mechanism whenever any one of the terminal voltages is lower than the under-current reference value.

10. The short protection control circuit of claim 9, wherein the pulse resets the timer.

11. The short protection control circuit of claim 8, wherein the timer has a clock input terminal, the short protection control circuit further comprising:

a second logic circuit for sending a clock signal to the clock input terminal when a dimming signal is enabled.

12. The short protection control circuit of claim 8, wherein the timer has a clock input terminal, the short protection control circuit further comprising:

a second logic circuit coupled to the clock input terminal and the first logic circuit for blocking the clock signal from reaching the clock input terminal when the short protection mechanism is resumed.

13. The short protection control circuit of claim 8, wherein the timer has a clock input terminal, the short protection control circuit further comprising:

an over-voltage detection circuit for detecting whether an output power exceeds an over-voltage value; and a second logic circuit coupled to the clock input terminal, the first logic circuit, and the over-voltage detection circuit for blocking the clock signal from reaching the clock input terminal after the short protection mechanism is blocked and when the output power does not exceed the over-voltage value.

14. A control method for use in controlling a short protection mechanism providing short protection to a plurality of light-emitting diode (LED) chains, wherein a plurality of driving currents flow through the LED chains, the control method comprising:

detecting whether at least one of the driving currents encounters an under-current event;

blocking a short protection mechanism when the under-current event is encountered, wherein the short protection mechanism provides short protection to the LED chains;

resetting a counter every time the under-current event is encountered; and resuming the short protection mechanism when a count result of the counter exceeds a predetermined result.

\* \* \* \* \*